Patented Mar. 14, 1944

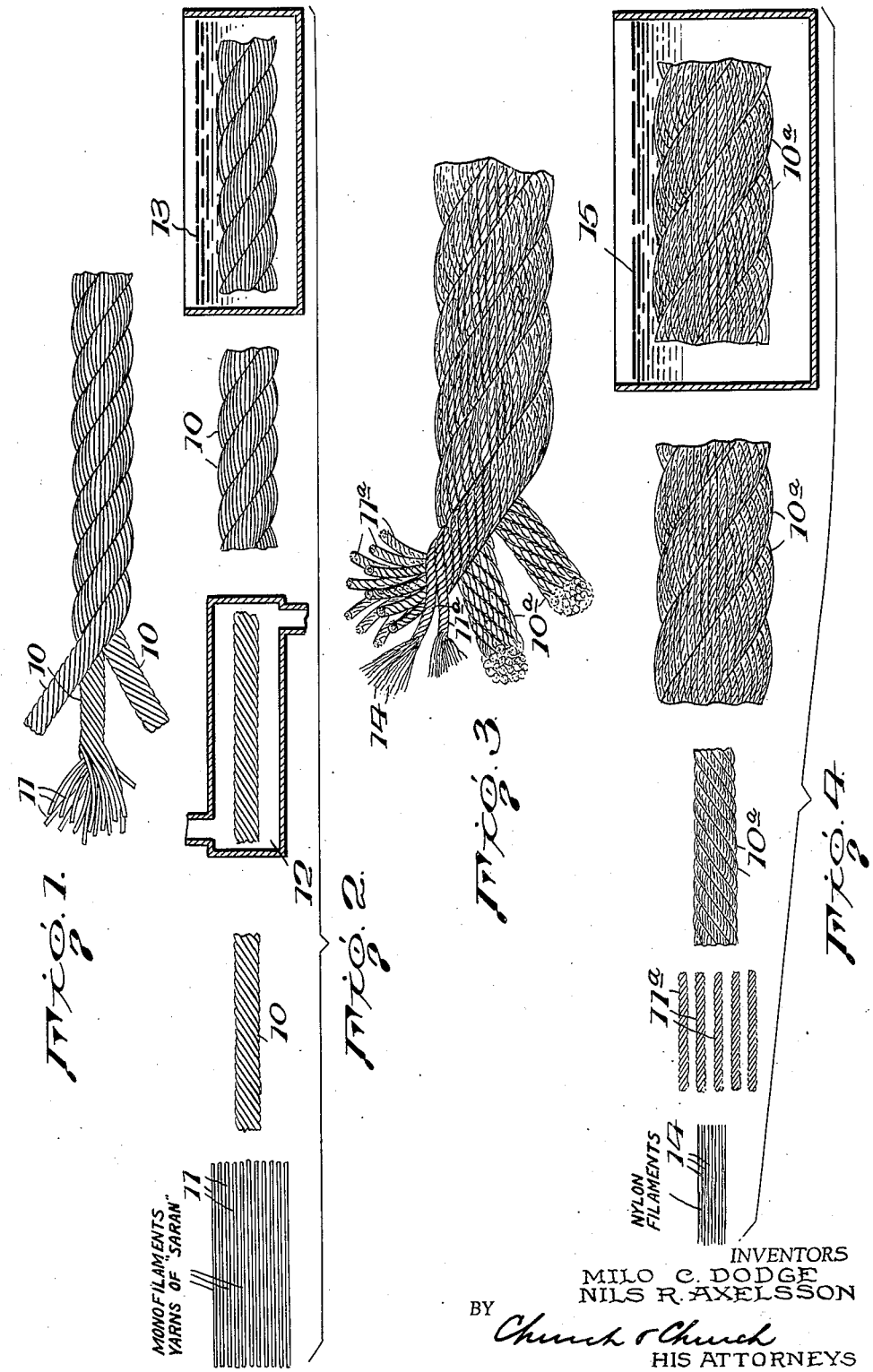

2,343,892

UNITED STATES PATENT OFFICE 2,343,892

ROPE STRUCTURE AND METHOD OF MAKING SAME

Milo C. Dodge and Nils R. Axelsson, Auburn, N. Y., assignors to Columbian Rope Company, Auburn, N. Y., a corporation of New York Application October 9, 1942, Serial No. 461,462

8 Claims. (Cl. 57—140)

This invention relates to improvements in rope structures, and particularly to stranded ropes formed of synthetic, thermoplastic, resinous materials, and methods of making the same.

One object of the invention is to provide ropes of uniform cross-section throughout their length.

Another object is to provide ropes capable of withstanding heavy usage and wear.

Still another object is to provide ropes which are highly adapted to marine use by reason of the fact that the materials of which they are made are substantially water-repellent and immune to attack by micro-organisms which normally feed on vegetable fibres.

A still further object of the invention is to provide a rope which is peculiarly and especially adapted for aircraft use, particularly in towing glider planes. Present-day military practices contemplate the transportation of troops in aircraft of the glider plane type which have no power of their own, but are towed by another powered plane. In the take-off of the glider from its position of rest on the ground and the towing of the glider, excessive strains are imposed on the tow-rope and on the planes themselves, and the present invention contemplates the production of a rope which will greatly relieve these strains.

A further object of the invention is to provide a rope formed of filaments of synthetic, thermoplastic materials. Due to the wildness or the tendency of these filaments to untwist after they have been formed into the strands of rope, a rope or strand made thereof is normally rather unstable, but we have found that by heat-treating the rope or, in some instances, the strands before the latter are formed into the rope, the strands or the rope, as the case may be, can be stabilized in the sense that there remains only a negligible tendency of the structural elements of the rope to untwist. This is highly important, particularly in view of the desire to produce ropes or tow-lines of synthetic, thermoplastic materials for use in towing or transporting glider planes carrying relatively heavy loads. In towing glider planes, a tremendous strain or stress is placed on the tow-line, and on the towing plane and glider, not only when the tow-line becomes taut between the towing plane and glider in the take-off of the latter, but also during sustained flight. For this reason, the present invention proposes the use of materials in the tow-line which make the line capable of stretching considerably, while still permitting the line to return to or substantially recover its original length. A material of this nature is now on the market under the trade name "nylon." A rope made of "nylon" will absorb all the stresses imposed on a glider tow-line. However, in the use of tow-lines of this type, there has developed considerable difficulty in that hockles or back-turns form in the tow-line when the glider is cut loose from its towing plane. When the glider is cut loose, the pull or lengthwise strain previously imposed on the tow-line is relieved and the latter is free to turn or twist, under which circumstances there is a great tendency for hockles or back-turns to develop. However, I have discovered that by stabilizing the tow-line as proposed herein this difficulty of hockles or back-turns forming is eliminated, because there is no tendency on the part of the line to unduly turn or twist under any such conditions. Of course, the present rope or tow-line, when relieved of its longitudinal load, will turn or twist slightly to assume its normal lay, but no hockles or back-turns will form.

Another object is to provide a stranded rope in which the strands are formed of unitary yarns, as distinguished from spun yarns or multi-filament yarns, of a synthetic, thermoplastic, resinous material. The twist in these yarns, as well as in the strands made therefrom, is maintained or set by the application of heat. Where these heavy unitary yarns are used, as in this specific embodiment of the invention, their normal resiliency is such that they, as well as the strands formed therefrom, tend to straighten out after being twisted. For this reason, in this specific embodiment of the invention, it is intended to, first, apply heat to the strands before the latter are twisted together to form the rope, and, later, to apply heat to the rope itself, whereby the original wildness of the yarns and strands is reduced and the tendency to untwist overcome or eliminated. Thus, the set or lay of the yarns in the strands and of the strands in the rope is maintained at all times.

In the accompanying drawing—

Figure 1 is a perspective view of a section of rope made according to the present invention, the end of the rope being partially untwisted to better illustrate the individual yarns;

Fig. 2 is a diagrammatical illustration of the method of forming the rope shown in Fig. 1;

Fig. 3 is a view similar to Fig. 1, illustrating a modified form of rope; and

Fig. 4 is a diagrammatical illustration of the method of forming the rope shown in Fig. 3.

The rope shown in Fig. 1 is formed of a plurality of strands, three being the usual number, and each strand is, in turn, formed of a multiplicity of yarns 11, the number of yarns in each strand depending upon the size of the individual yarns and the size of the rope to be produced. In accordance with usual practice, the yarns of a strand are twisted together in one direction and, in forming the strands into the rope, they are twisted together in the opposite direction. It will be noted that the yarns in this particular form of rope are unitary filaments, as distinguished from a spun yarn composed of a plurality of fibres, ends or other filamentary elements, and, in this connection, it is preferred to make the yarns comparatively heavy or of comparatively large cross-sectional area, so that they will have a relatively high degree of wear resistance in the sense that each yarn will withstand considerable abrasion before breaking.

As previously stated, it is preferable to provide a rope of uniform size, which is substantially water-repellent and immune to attack by microorganisms which normally feed on vegetable fibres. For this purpose, it is preferred that the yarns 11 be made of synthetic chemical polymers of organic, but non-cellulosic, nature, which can be produced in substantially continuous lengths of uniform diameter and weight. However, due to the cross-sectional size of the individual yarns, where unitary yarns are used, and necessity of twisting first the yarns into strands and then the strands into rope formation, the normal wildness or stiffness of yarns of the nature proposed is such that the yarns in the individual strands tend to untwist before the rope is formed and, after the rope is formed, the strands themselves have a strong normal tendency to untwist. In accordance with the present invention, therefore, only those materials of the character above described which are thermo-plastic are used in making the yarns. That is, the yarns must be capable of being rendered somewhat plastic and of being re-set, so to speak, without detrimentally affecting them, so far as concerns their wearing properties. At the present time, I believe the material which best answers these purposes consists of synthetic chemical polymers of organic, but non-cellulosic, nature, and, particularly, filament-forming polyamides which may be preptred as disclosed in Letters Patent of the United States, Nos. 2,183,602, dated June 6, 1939, and 2,233,442, dated March 4, 1941. These polyamides may be fashioned or processed in a number of ways to form filaments of continuous lengths of substantially uniform diameter and weight from point to point throughout their lengths. This particular material is now known as "Saran."

The yarns made thereof can be heated to soften them and modify their original stiffness or wildness after being formed into a strand, so that they can accommodate themselves, in a sense, to their spiral arrangement in the strand, after which they can be reset, so to speak, in their spiraled arrangement. Thus, they lose their wildness or tendency to untwist. Likewise, the rope can be heat-treated to overcome the tendency of the strands, themselves, to untwist.

For this purpose, the rope of Fig. 1 is produced by the method illustrated in Fig. 2, wherein the yarns are first twisted into a strand and the strand subjected to a temperature sufficient to partially plasticize the twisted yarns. Preferably, the strand is passed through a body of heated air, for instance, through a heated chamber 12. If desired, the strand can be heated in a liquid bath or by placing a quantity thereof in a heated chamber. The degree of heat to which the strands are subjected should not be so high nor the length of such treatment of such duration as to unduly soften the yarns. It is only necessary to plasticize them to an extent which will permit them to retain their spiral arrangement in the strand. That is, sufficient springiness or wildness is taken out of them to practically eliminate their original tendency to untwist. Immediately after this heat treatment, the temperature of the strands is reduced to stabilize the yarns, it being understood that the hardening of the yarns at the time of their production is considered the original setting of the material constituting them. Artificial means may be resorted to for this stabilizing step, but, in most instances, prevailing room temperatures will serve the purpose.

The yarns having been set in the strands, the latter are at any subsequent time twisted into rope formation. As stated, three strands are usually used and they are twisted together in a direction opposite to that in which the yarns were twisted when forming the strands. After the strands have been twisted together, they are also subjected to heat treatment. Preferably, in this instance, the treatment consists in passing the rope through a bath 13 of water heated to the desired temperature. As in the case of heating the yarns, the degree of heat and the duration of heating, in the case of both the strands and the rope, should be such as to merely permit the strands to conform to their normal spiral arrangement in the rope structure. After such heat treatment, the rope is permitted to cool, and it will be found that the strands no longer possess such a degree of wildness as will cause them to untwist. It is not actually compulsory that the strands be heat-treated before being twisted into rope, but, due to the wildness of filaments made of this particular material ("Saran"), it is preferred to heat the strands to at least partially stabilize them, because they can then be handled more easily. In actual practice, the heat treatment of the strands has been carried out by subjecting them to a temperature of approximately 110° F. for a period of about two hours, and the rope has been subjected to a temperature of about 160° F. for five minutes. However, as indicated, these particular temperatures and time periods are not critical. They may be varied to some extent, the only point to be guarded against being that the yarns, strands or rope should not be softened or plasticiced to such an extent as to cause the structural elements to fuse to one another. The use of the lower temperature in setting the strands is due to the fact that the strands, as such, must be only partially set in order that they will still possess limited ability to counteract the twisting that is imparted to them in twisting them into the rope. After the rope is formed the higher temperature is used to more completely set the finished product.

Figs. 3 and 4 illustrate a modified form of rope, in that the yarns thereof are each formed of a multiplicity of filaments or ends. Ropes of this type have been made of so-called "nylon," a material produced in accordance with the teachings of United States Letters Patent Nos. 2,130,523, 2,130,947 and 2,130,948, dated September 20, 1938. In the actual production of this rope ten ends or filaments 14, or a multiple of ten ends of filaments of "nylon" have been arranged in tape-like form, and spun into yarns 11a, and the latter twisted into strands 10a which, in turn, have been twisted into the finished rope in accordance with usual rope-making practices. Usually the rope is formed of three strands as shown, but the number of yarns in a strand will vary for different sizes of rope. It is also possible to increase the number of strands. Due to the smaller size of the filament of "nylon," compared with the size of the single filament yarn used in the rope of Figs. 1 and 2, the yarns in this modified form of rope and the strands made therefrom are not as wild as those of the rope of Figs. 1 and 2 and, hence, it has not been found necessary to heat-treat the strands before they are twisted into the rope. The twist in the rope made of "nylon" will develop hockles or back-turns unless heat-treated, and, for this reason, this so-called "nylon" rope is subjected to heat treatment. As shown in Fig. 4, this treatment may consist in immersing the rope in a bath 15 of boiling water for approximately fifteen minutes, although, here again, the heat and time factors can be varied so long as the material is not unduly softened. After being heat-treated, the rope is allowed to cool and dry at room temperature, although the time factor involved in this drying step may be reduced by subjecting the rope to a blast of air, preferably at room temperature.

At the present time, this "nylon" rope is believed to be preferable for glider plane transportation, as it possesses the ability to stretch approximately 30 per cent and still recover substantially its original length. Due to this characteristic, the strains imposed on the towing plane and glider during the take-off of the latter and during flight are negligible. In fact, it has heretofore been proposed to make structural changes in the towing planes and gliders to take care of the strains set up in these structures where ordinary ropes were used for towing. However, actual towing tests with the present rope have demonstrated that this stretchability of the "nylon" rope absorbs practically all strains, so that proposed structural changes in the planes have been rendered unnecessary. As previously stated, the heat treatment of the "nylon" rope removes all tendency of the rope to hockle or back-turn, and, due to the softness of the strands in this type of rope, the rope has a life comparable to that of a rope made of mono-filament yarns, as shown in Fig. 1.

Rope made in accordance with the present invention posseses high wearing properties and, as will be appreciated, the larger the yarns are made, the longer it will take to destroy the life of the strand and, consequently, the rope, by abrasion. By the same token, the method of making the rope, particularly the heating and stabilizing of the yarns and strands, permits the use of relatively heavy yarns in the mono-filament yarn type of rope, whereby the life of such rope can be materially prolonged.

While two thermoplastic materials have been especially referred to herein, it will be appreciated that the present invention is applicable to other thermoplastics susceptible of use in rope-making and possessing the wildness or property of developing hockles or back-turns unless heat-treated as disclosed herein.

What we claim is:

1. The method of forming a stranded rope structure composed of synthetic thermoplastic yarns which consists in twisting a plurality of said yarns into a strand, twisting a plurality of strands together to form said rope, immersing said rope in a liquid bath heated to a temperature to soften the material forming said yarns and strands without substantially decreasing the stretchability of the yarns and strands whereby said yarns and strands are rendered sufficiently plastic to permanently assume the twist imparted to them in forming said rope without materially reducing the stretchability of the rope, and then cooling said rope to set said yarns and strands.

2. The method of forming a rope structure composed of synthetic thermoplastic elements which consists in twisting a plurality of said elements into strands, subjecting said strands to heat and then cooling the same to set the twist in said elements in said strand without substantially affecting the stretchability of the strand, twisting a plurality of said strands together in a direction opposite to the twist in the individual strands to form the rope, and subjecting said rope to heat and then cooling the same to set the twist in said strands without substantially reducing the stretchability of the rope.

3. The method of forming a rope structure of comparatively heavy, stiff elements of a thermoplastic material which consists in twisting said elements into strands, subjecting the strands to a heated atmosphere of a temperature to plasticize asid elements and then cooling the same to set the twist in the elements in said strands without materially reducing the stretchability of the strands, twisting a plurality of said strands together in a direction opposite to that in the individual strands, and passing the rope formed by said twisted strands through a liquid bath of a temperature to plasticize said strands and then cooling the same to set the twist in said strands without substantially reducing the stretchability of the rope.

4. The method of forming a stranded rope structure composed of filaments of synthetic thermoplastic material which consists in arranging a plurality of said filaments lengthwise of one another in tape-like formation, spinning said tape-like group of filaments into yarns, twisting yarns formed of said filaments into strands, twisting said strands into a rope, subjecting said rope to heat to only partially soften said material whereby the structural elements of the rope may assume the twist remaining therein when said rope is formed without materially reducing the stretchability of the rope, and permitting said rope to cool to set said structural elements with said remaining twist therein.

5. An elastic, stretchable heavy-duty stranded rope made by the method set forth in claim 1.

6. An elastic, stretchable heavy-duty stranded rope made by the method set forth in claim 2.

7. An elastic, stretchable heavy-duty stranded rope made by the method set forth in claim 3.

8. An elastic, stretchable heavy-duty stranded rope made by the method set forth in claim 4.

MILO C. DODGE.
NILS R. AXELSSON.